No. 875,086. PATENTED DEC. 31, 1907.
C. G. LUFT.
HONEY EXTRACTOR.
APPLICATION FILED MAY 22, 1906.
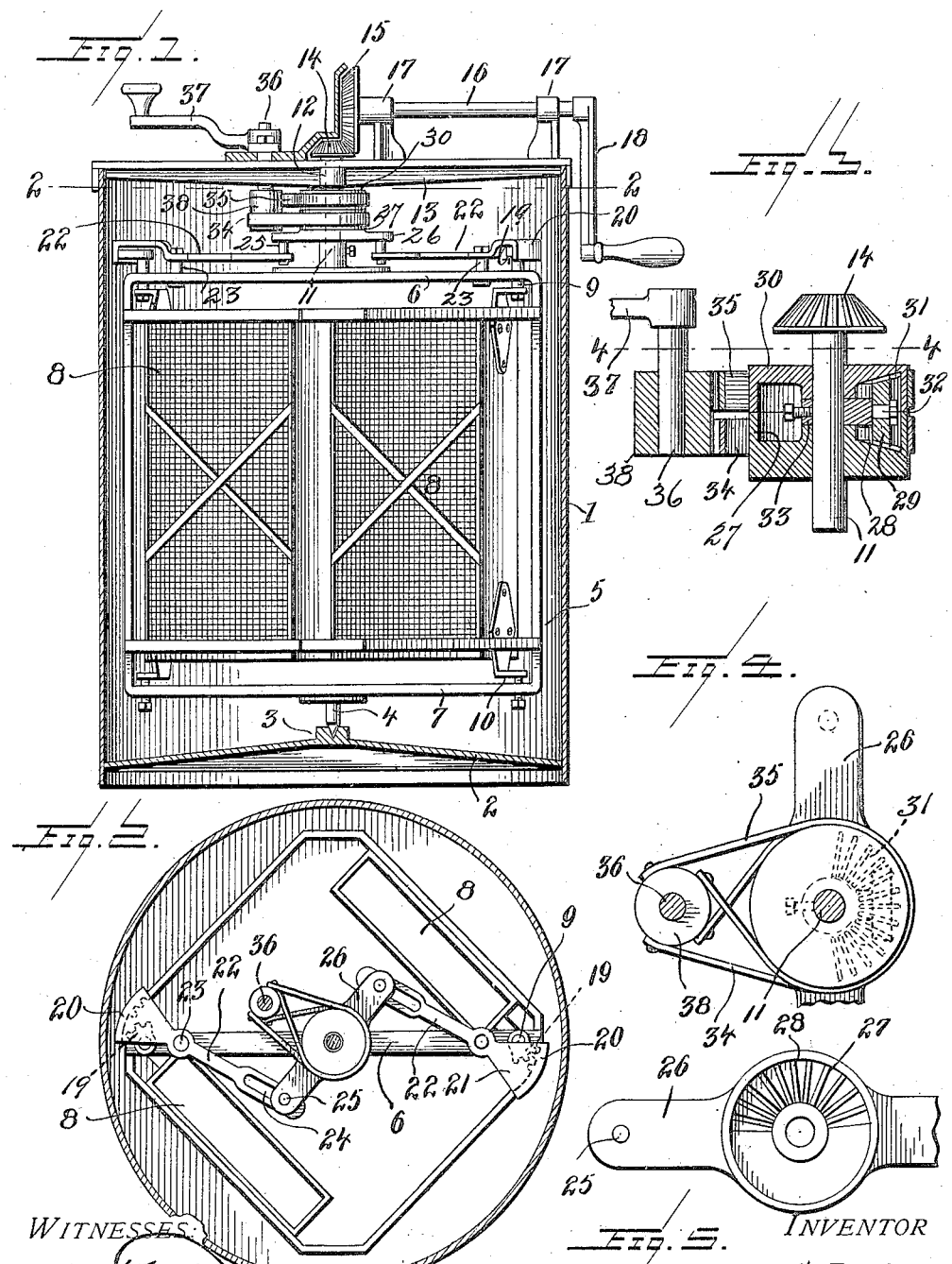
WITNESSES
INVENTOR
Christian G. Luft.
BY
Attorney

UNITED STATES PATENT OFFICE.

CHRISTIAN G. LUFT, OF FOREST, OHIO.

HONEY-EXTRACTOR.

No. 875,086.   Specification of Letters Patent.   Patented Dec. 31, 1907.

Application filed May 22, 1906. Serial No. 318,200.

*To all whom it may concern:*

Be it known that I, CHRISTIAN G. LUFT, a citizen of the United States, residing at Forest, in the county of Hardin and State of Ohio, have invented certain new and useful Improvements in Automatic Reversible Honey-Extractors, of which the following is a specification.

This invention relates to the art of extracting honey from honey combs, and has specially in view certain practical improvements in that type of honey extractors embodying means for reversing the comb holding baskets or frames while the extractor is in motion. In this connection, the invention has specially in view an improvement upon the reversible honey extractors having the operation of the machine disclosed in the patent to F. G. Marbach, No. 787,104, dated April 11, 1905.

In the type of honey extractor disclosed in the patent above referred to, there can be only one reversal of the comb-baskets without stopping the extractor, and furthermore, in the said patented construction the comb-baskets must be in a definite position relative to the rotation of their support before reversal can take place. In the light of this operation of the said patented construction of honey extractor, the present invention contemplates improved means for reversing the comb-baskets back and forth any number of times without stopping the extractor or reversing its motive power, and for allowing the direction of rotation of the motive power to be either direct or reverse as may be convenient.

Further objects of the invention are to better adapt a honey extractor, of the said patented type, to the use of a non-reversing motive power, and to avoid the necessity of having to place the comb-baskets in a certain relation position to effect reversal. Also, the invention provides means to prevent, in part at least, the baskets from slamming when reversed.

With these and many other objects in view which will more readily appear as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural change without departing from the scope of the invention, but a preferred embodiment of the latter is shown in the accompanying drawings, in which, Figure 1 is a sectional view partly in elevation of a two basket or two frame honey extractor equipped with the improvements contemplated by the present invention. Fig. 2 is a top plan view thereof, the line of section being indicated by the line 2—2 in Fig. 1. Fig. 3 is an enlarged detail sectional view of the duplex reversing mechanism. Fig. 4 is an enlarged detail sectional view on the line 4—4 of Fig. 3. Fig. 5 is a detail top plan view of the central portion of the oscillatory lever-actuator.

In carrying out the present invention, no special change is contemplated or required in the general features of the type of honey extractor disclosed in the said patent to Marbach, No. 787,104, so for illustrative purposes there is shown in the drawings the said patented type of reversible honey extractor equipped with the herein described novel improvements.

Referring to the illustrative embodiment of the invention in the drawings, the numeral 1 designates an upright container case designed to accommodate and support the working parts of the mechanism, and to collect the honey extracted from the honey-combs. The said container case 1 is illustrated as being provided at the apex of its conical bottom 2 with a central bearing step 3 in which is stepped the lower journal stud 4 of an upright revoluble carrier frame 5. This carrier frame is of the same type of construction as disclosed in the patent referred to, the same being of a skeleton formation and provided with the upper and lower transverse frame bars 6 and 7 respectively, which provide for the proper pivotal support of the swinging reversible comb-baskets or frames 8. These comb-baskets or frames 8 are of the usual foraminous or perforated construction and have fitted to the upper and lower corners of one side thereof, the upper and lower pivot members 9 and 10 which are respectively fitted in or on the upper and lower frame bars 6 and 7, thereby permitting the individual comb-baskets 8 to freely swing to either side of their pivots, irrespective of the direction or path of rotation of the carrier frame 5.

To provide for the complete pivotal support of the revoluble or rotatable carrier frame 5, the latter has fitted centrally to the upper bar 6 thereof, the upper driving journal spindle 11 having a bearing mounting, as at 12, in the center of the top cross brace 13 for the case or tub 1, and provided at its upper extremity with a driven pinion 14 meshing with a beveled driving gear 15 carried at the inner end of the drive shaft 16. This drive shaft is journaled in suitable bearing supports 17 arranged on the top cross brace 13, and has fitted to the outer extremity thereof, an operating handle or crank 18 which is manipulated to provide for rotating the carrier frame within the case.

In carrying out the present invention, any desired number of comb-baskets 8 can be employed, but for illustrative purposes there is shown in the drawings what is known as a two basket or two frame extractor, and the upper pivot member or stud 9 of each basket 8 is equipped with a partial gear pinion 19 which is designed to mesh with a swinging gear segment 20 carried on the flanged heel 21 of a horizontally swinging reversing lever 22 pivotally supported intermediate its ends, as at 23, upon the upper side of the upper frame bar 6. The inner end portion of each reversing lever 22 is longitudinally slotted, as at 24, for engagement by the connecting pin 25 carried by an oscillatory lever actuator 26.

In the two basket or two frame type of extractor, as shown in the drawings, the actuator 26 is in the form of a cross arm loosely mounted upon the upper journal spindle 11 for the carrier frame, and is provided with an upstanding brake hub 27 in the base of which is formed a short section or segment of teeth 28. The toothed segment 28 of the actuator 26 is adapted to mesh with a transmitting pinion 29 interposed between the brake hub 27 and the supplemental brake disk 30 which is of a cup formation and is provided in the base portion thereof with a short toothed segment 31 bearing complemental relation to the toothed segment 28, and also having meshing therewith the pinion 29. The said pinion 29 is journaled on a stub spindle 32 carried by a shaft collar 33 fast on the upper driving journal 4 of the carrier frame 5. The cupped members 27 and 30 are arranged in matching relation to house the pinion 29 therein, and the said members are designed to be embraced by separate brake bands 34 and 35 respectively.

Various expedients may be resorted to for tightening and loosening the brake bands 34 and 35, whereby one band is tightened simultaneously with the loosening of the other, but a simple and practical means for accomplishing this result is shown in the drawings. This means consists in employing a short controlling rock shaft 36 suitably supported by the top cross brace 13 and carrying upon its outer end a brake lever 37. The inner end of said shaft 36 is provided with a drum or cylindrical enlargement 38 to which are respectively secured in reversed relation, the terminals of the separate brake bands 34 and 35. As plainly shown in Fig. 4 of the drawings, this arrangement involves attaching both ends of one brake band to the shaft or shaft drum 38 at one side of the axis of the latter, and attaching the ends of the other band on said drum at the opposite side of the axis of the shaft. Hence, when the shaft, 36, is rocked in one direction, one of the brake bands loosens, and the other tightens, and when rocked in the opposite direction the reverse operation takes place, as will be readily observed.

To operate the herein described extractor, the carrier frame 5 is set in motion in either direction, back to the original position without stopping the machine, it is simply necessary, by the present invention, to tighten the upper band for the upper brake member 30, thereby transmitting a reverse motion to the members 26—27 through the transmitting pinion 29. It will be obvious that by first applying one of the brakes and then the other, the intervening transmitting pinion 29 secures a thorough reversal of the comb-basket without stopping the extractor or reversing its motive power.

To prevent breaking the honeycombs or to secure better equilibrium, it may be desirable at times to reverse the baskets more than once in extracting a set of combs, and to do so without stopping the extractor saves considerable time and power. Also, this invention avoids the necessity of having to place the baskets in the regular position before reversal.

I claim:

1. In a honey extractor, the combination of a revoluble carrier frame, pivotal comb-baskets carried thereby, and a reversing mechanism having a pair of intergeared brake members arranged to transfer motion from one to the other, and reversing connections between one of said brake members and the baskets, and means for separately braking the brake members.

2. In a honey extractor, the combination with a revoluble carrier frame having a driving journal, and pivotal comb-baskets carried by said frame, of a reversing mechanism comprising a pair of complemental brake members mounted on said driving journal and having toothed surfaces, a transmitting pinion having a fixed support on the driving journal and interposed between and meshing with said separate brake members, a separate brake band for each of said brake members, and a controlling shaft carrying a brake lever and having reversed connections respectively with the separate brake bands whereby a movement of the shaft in one direction simultaneously tightens one band and loosens the other.

3. A centrifugal honey extractor comprising a revoluble frame, pivotal comb-baskets carried thereby, reversing mechanism for said comb-baskets, said reversing mechanism comprising hub members connected to one another so as to have an opposite rotation, one of said hub members having a connection with the comb-baskets, a reversing lever, and connections between said reversing lever and the said hub members, the said connections being so arranged whereby a movement of the reversing lever causes a relative opposite movement of the hub members.

In testimony whereof I hereunto affix my signature in the presence of two witnesses.

CHRISTIAN G. LUFT.

Witnesses:
W. S. HEMFRY,
E. H. COOK.